US012571768B2

(12) United States Patent　　(10) Patent No.:　US 12,571,768 B2
Ma et al.　　(45) Date of Patent:　Mar. 10, 2026

(54) EDDY CURRENT TESTING CIRCUIT, METHOD AND SYSTEM, STORAGE MEDIUM, AND TERMINAL

(71) Applicant: Deyuan Technology Co., Ltd., Chengdu (CN)

(72) Inventors: Qiuping Ma, Chengdu (CN); Bin Gao, Chengdu (CN); Liang Shen, Chengdu (CN); Fei Luo, Chengdu (CN); Shiqiang Jiang, Chengdu (CN); Yong Zhang, Chengdu (CN)

(73) Assignee: Deyuan Technology Co., Ltd., Chengdu (CN)

( * ) Notice: Subject to any disclaimer, the term of this patent is extended or adjusted under 35 U.S.C. 154(b) by 0 days.

(21) Appl. No.: 19/103,823

(22) PCT Filed: Dec. 26, 2022

(86) PCT No.: PCT/CN2022/141800
§ 371 (c)(1),
(2) Date: Feb. 13, 2025

(87) PCT Pub. No.: WO2024/036858
PCT Pub. Date: Feb. 22, 2024

(65) Prior Publication Data
US 2025/0258135 A1　Aug. 14, 2025

(30) Foreign Application Priority Data
Aug. 15, 2022　(CN) .......................... 202210981470.5

(51) Int. Cl.
G01N 27/90　(2021.01)
(52) U.S. Cl.
CPC ..... G01N 27/9046 (2013.01); G01N 27/9006 (2013.01)

(58) Field of Classification Search
CPC ....................... G01N 27/9006; G01N 27/9046
(Continued)

(56) References Cited

U.S. PATENT DOCUMENTS 6,636,037 B1 * 10/2003 Ou-Yang ............. G01N 27/902
324/234
2008/0309328 A1　12/2008 Qiao et al.

FOREIGN PATENT DOCUMENTS

CN　　103336049 A　10/2013
CN　　111398413 A　7/2020
(Continued)

OTHER PUBLICATIONS

Gao et al.; Translation of CN 111398413 A; Jul. 10, 2020; Translated by Google & EPO (Year: 2020).*
(Continued)

*Primary Examiner* — Alesa Allgood
*Assistant Examiner* — Rahul Maini
(74) *Attorney, Agent, or Firm* — Bayramoglu Law Offices LLC

(57) ABSTRACT

An eddy current testing circuit, method and system, a storage medium, and a terminal belong to the technical field of eddy current non-destructive testing. A dual-path differential probe is formed mainly by combining a differential bridge and a transformer conditioning circuit, and relationships between amplitudes, phase parameters and lift-off respectively generated under alternating magnetic fields are analyzed by using signal parameters generated by a first differential signal and a second differential signal under respective alternating magnetic fields. Multi-parameter signal fusion is performed, so that the lift-off can be suppressed, and dual-path differential output achieves a high testing capability for defects under high lift-off change.

10 Claims, 11 Drawing Sheets

(58) Field of Classification Search
  USPC ........................................................ 324/222
  See application file for complete search history.

(56) References Cited

FOREIGN PATENT DOCUMENTS

| | | |
|---|---|---|
| CN | 115406959 A | 11/2022 |
| JP | 2005121506 A | 5/2005 |

OTHER PUBLICATIONS

Denis Ljike Ona, et al., Investigation of Signal Conditioning for Tx-Rx PEC Probe at High Lift-Off Using a Modified Maxwell's Bridge, IEEE Sensors Journal, 2020, pp. 2560-2569, vol. 20 No. 5.

Kefan Chen, et al., Differential Coupling Double-Layer Coil for Eddy Current Testing With High Lift-Off,, IEEE Sensors Journal, 2021, pp. 18146-18155, vol. 21 No. 16.

\* cited by examiner

Lift-off change curve of a bridge probe (amplitude)

Lift-off change curve of transformer output (amplitude)

EDDY CURRENT TESTING CIRCUIT, METHOD AND SYSTEM, STORAGE MEDIUM, AND TERMINAL

CROSS REFERENCE TO RELATED APPLICATIONS

This application is the national phase entry of International Application No. PCT/CN2022/141800, filed on Dec. 26, 2022, which is based upon and claims priority to Chinese Patent Applications No. 202210981470.5, filed on Aug. 15, 2022, the entire contents of which are incorporated herein by reference.

TECHNICAL FIELD

The present invention relates to the technical field of eddy current nondestructive testing, and in particular to an eddy current testing circuit, method and system, a storage medium, and a terminal.

BACKGROUND

Non-destructive testing technology is based on the premise of not destroying the internal structure of the tested object, and uses physical methods to test and evaluate the possible discontinuities inside the object. Eddy current testing is an important method in many categories of nondestructive testing methods. Its principle is to apply an alternating current at the end of the excitation coil, thus generating an alternating magnetic field. The magnetic field interacts with the tested component to generate an alternating eddy current in the tested component. The eddy current in the tested component generates a secondary magnetic field. The testing sensor is used to test the superimposed field of a source magnetic field and the secondary magnetic field. The testing and identification of defects in the tested component are realized through the analysis of the testing signal. Therefore, the structure of the coil determines the distribution and coupling relationship of the magnetic field, which is closely related to the testing performance. Most of the existing eddy current array sensors are designed and optimized in terms of the structure and manufacturing process of eddy current sensors to improve the testing capability for defects.

However, during eddy current testing, there is a lift-off distance in the non-contact testing between the sensing probe and the pipe wall, and the randomness of the testing working conditions often makes the lift-off non-constant (such as pipeline testing and rail testing). Therefore, with the change of lift-off, this distance changes the mutual inductance of the circuit formed by the probe and the metal conductor, which will cause the lift-off waveform signal to be mistaken for a defect signal, thus affecting the qualitative judgment of whether a defect exists. In addition, the original defect signal will be affected by the interference of lift-off, resulting in changes in parameters such as the amplitude and the phase, which will bring challenges to the quantitative analysis of defects, making it impossible to accurately quantify the size of defects and evaluate the damage state. Therefore, the lift-off problem is a key issue in eddy current testing. It is necessary to suppress its interference effect to improve the accuracy and reliability of testing. In order to eliminate lift-off noise and increase the testing capability for defects, relevant scholars have carried out a number of research works. The prior art CN111398413A discloses a testing sensor, which tests defect information by testing changes in the amplitude and phase output of the induction coil, and can perform defect testing under large lift-off, but the influence of lift-off on the excitation coil is not considered, and the testing accuracy cannot be guaranteed in the case of continuous changes in lift-off.

In addition, the prior art also puts forward the research on the characteristics of the transient response of the lift-off point of intersection (LOI) of a pulsed eddy current, using a lift-off suppression method based on signal processing technology, a slope fitting method, a data-driven method such as an artificial neural network and a wavelet transform, a multi-/dual-frequency excitation method, a design and optimization method of a sensing probe, etc. Although these methods all have a certain immune effect on lift-off, the defect information is still easily masked in random conditions such as railway or pipeline inspections or in high lift-off noise, and parameter adjustment setting is required. The modulation and demodulation of the system are complex, making it difficult to achieve engineering applications.

SUMMARY

The objective of the present invention is to suppress the interference of lift-off and enhance the testing capability for defects, propose an eddy current testing circuit, method and system, a storage medium, and a terminal. A dual-path differential probe is constructed by using a differential bridge and a transformer-type conditioning circuit structure. Based on an equivalent circuit model, the relationships between the amplitudes, phase parameters and lift-off respectively generated by the dual-path differential probe under an alternating magnetic field are established, and a method for multi-parameter signal fusion is proposed.

The objective of the present invention is achieved through the following technical solutions:

In one solution, an eddy current testing circuit is provided, including:

a probe, including an excitation unit and an induction unit, where the excitation unit forms a differential bridge for receiving an excitation signal and outputting a first differential signal, and the induction unit couples with the excitation unit to form a transformer conditioning circuit and output a second differential signal; and a differential signal processing unit, configured to receive the first differential signal and the second differential signal, analyze a relationship between a parameter of the first differential signal, a parameter of the second differential signal and lift-off under an alternating magnetic field, and fuse the parameter of the first differential signal with the parameter of the second differential signal to eliminate an influence of the lift-off on the signals.

In a further solution, the excitation unit is composed of a plurality of excitation coils arranged in a row side by side, and the induction unit is composed of a plurality of induction coils placed in one-to-one correspondence with the excitation coils, where the induction coils and the excitation coils have opposite coil winding directions;

an input end of the excitation coil is connected to an output end of a signal generator, the plurality of excitation coils are connected in parallel, and an output end of the excitation coil is connected with a capacitor or a resistor; output ends of two adjacent excitation coils are both connected to a first differential amplifier; and output ends of two adjacent induction coils are connected to a second differential amplifier.

In a further solution, the excitation coil and the induction coil are placed side by side, the two adjacent excitation coils serve as two arms of an alternating current bridge, and two corresponding capacitors or resistors are connected to other two arms of the alternating current bridge.

In another solution, an eddy current testing method is provided, including steps of:

S1. acquiring a first differential signal and a second differential signal output by a probe in the case of lift-off change, where the first differential signal is output by an excitation unit of the probe, and the second differential signal is output by an induction unit of the probe;

S2. analyzing a relationship between a parameter of the first differential signal, a parameter of the second differential signal and lift-off under an alternating magnetic field; and S3. fusing the parameter of the first differential signal with the parameter of the second differential signal to eliminate an influence of the lift-off on the signals.

In a further solution, for the eddy current testing method, the S2 includes:

calculating an amplitude and a phase parameter of the first differential signal, and calculating an amplitude and a phase parameter of the second differential signal; and analyzing a relationship between the amplitude of the first differential signal, a phase of the first differential signal, the amplitude of the second differential signal and a phase of the second differential signal each and the lift-off.

In a further solution, for the eddy current testing method, the S3 includes:

fusing the amplitude of the first differential signal with the amplitude of the second differential signal;

performing linear processing on the phase parameter of the first differential signal and/or the second differential signal; and fusing a fused amplitude with a linearly processed phase parameter to obtain a final testing signal.

As a preferable solution, for the eddy current testing method, influences of the lift-off on the amplitude parameters of the two differential signals are negatively correlated.

In a further solution, for the eddy current testing method, the performing linear processing on the phase parameter of the first differential signal and/or the second differential signal includes:

performing a differential operation using the phase parameter of the first differential signal and/or the second differential signal to remove nonlinearity thereof.

In another solution, based on the same inventive concept as that of the testing method, an eddy current testing system is provided, including:

a differential signal acquisition module, configured to acquire a first differential signal and a second differential signal output by a probe in the case of lift-off change, where the first differential signal is output by an excitation unit of the probe, and the second differential signal is output by an induction unit of the probe;

a parameter calculation module, configured to analyze a relationship between a parameter of the first differential signal, a parameter of the second differential signal and lift-off under an alternating magnetic field; and a multi-parameter fusion module, configured to fuse the parameter of the first differential signal with the parameter of the second differential signal to eliminate an influence of the lift-off on the signals.

In another solution, a storage medium having computer instructions stored thereon is provided, where when the computer instructions run, the eddy current testing method is performed.

In another solution, a terminal is provided, including a memory and a processor, the memory having stored thereon computer instructions runnable on the processor, where when the processor runs the computer instructions, the eddy current testing method is performed. It should be further described that the technical features corresponding to the above solutions can be combined or replaced with each other to form new technical solutions without conflict.

Compared with the prior art, the present invention has the following beneficial effects:

(1) in the testing circuit of the present invention, the excitation unit of the probe forms the differential bridge, and the induction unit is coupled with the excitation unit to form the transformer conditioning circuit. The entire probe adopts a combination mode of the differential bridge and the transformer conditioning circuit, where the induction unit outputs the first differential signal, and the excitation unit outputs the second differential signal to form a dual-path differential output circuit. When the lift-off changes, under the alternating magnetic field, the differential signal processing unit acquires the first differential signal and the second differential signal generated by the induction unit and the excitation unit respectively. Dual-path differential output achieves a high testing capability for defects under high lift-off change. Meanwhile, the signal parameters of the two differential signals are fused. Since the lift-off change affects both the first differential signal and the second differential signal, the common influence of the lift-off on the two signals is eliminated by mathematically changing the two signals. The lift-off can be suppressed, the defect-testing capability can be improved when the lift-off changes, and operations such as parameter adjustment are not needed, indicating simple and practical properties.

(2) in the present invention, the amplitude of the first differential signal is fused with the amplitude of the second differential signal. The change amount after the amplitude fusion is only related to the coupling coefficient of the induction coil and the eddy current, which can reflect more information about the tested component and improve the testing capability. The phase parameters of the first differential signal and the second differential signal are linearly processed and fused with the fused amplitude. The fusion of multiple parameters can further enhance the defect information.

(3) in the present invention, the output end of the excitation coil is connected with the first differential amplifier, and the output end of the induction coil is connected with the second differential amplifier. The signals input into the amplifiers can be differentiated by using the differential amplifiers, so as to suppress common-mode signals (such as temperature, humidity, etc.), and amplify differential-mode signals caused by defects, thereby increasing the testing sensitivity for defects.

(4) in the present invention, the excitation coil and the induction coil are placed side-by-side. When this placement mode is adopted, the magnetic flux generated by the excitation coil received by the induction coil is low. Therefore, the background signal is weak, and more information about the tested component can be received. This placement mode has a better suppressing effect on the lift-off than the vertical placement mode. Secondly, the attenuation rate of eddy currents in the tested component is negatively correlated with the radius of the coil. When placed horizontally, the excitation coil can be regarded as the center of a circle, and the distance from the excitation coil to the induction coil can be regarded as the radius. Therefore, with a larger radius, the attenuation rate of eddy currents is slower, and in theory, deeper defects can be tested.

BRIEF DESCRIPTION OF THE DRAWINGS

Specific implementations of the present invention will be described in further detail below in conjunction with the drawings. The drawings described herein are used to provide a further understanding of this application and constitute a part of this application. Like reference numerals are used in these drawings to denote the same or similar parts. The schematic embodiments of this application and the descriptions thereof are used to explain this application, and do not constitute an inappropriate limitation of this application.

DETAILED DESCRIPTION OF THE EMBODIMENTS

Figure 1:
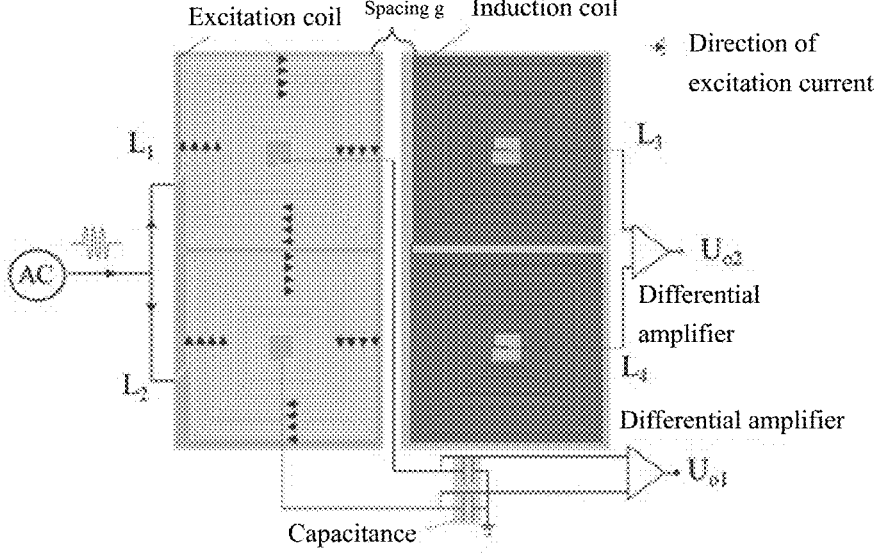
FIG. 1 is a schematic structural diagram of an eddy current testing probe according to the present invention.

The technical solution of the present invention will be clearly and completely described below in conjunction with the drawings. It is obvious that the described embodiments are some embodiments rather than all embodiments of the present invention. Based on the embodiments in the present invention, all other embodiments obtained by those of ordinary skill in the art without creative labor fall within the scope of protection of the present invention.

In the description of the present invention, it should be noted that directions or positional relationships indicated by terms such as "center", "upper", "lower", "left", "right", "vertical", "horizontal", "inner" and "outer" are those described based on the drawings only for convenience and simplification of the description of the present invention, and do not indicate or imply that the referred device or element must have a specific orientation, be constructed and operated in a specific orientation, and therefore cannot be understood as a limitation to the present invention. In addition, the terms "first" and "second" are only used for descriptive purposes and cannot be understood as indicating or implying relative importance.

In the description of the present invention, it should be noted that unless otherwise explicitly specified and defined, the terms "mounting", "connection" and "linkage" should be understood in a broad sense. For example, it can be a fixed connection, a detachable connection or an integral connection; it can be a mechanical connection or an electrical connection; and it can be a direct linkage or an indirect linkage through an intermediate medium, and it can be an internal communication of two elements. For those of ordinary skill in the art, the specific meanings of the above terms in the present invention can be understood in specific situations.

In addition, the technical features involved in different implementations of the present invention described below can be combined with each other as long as there is no conflict among them.

In the present invention, a combination mode of a differential bridge and a transformer conditioning circuit is mainly adopted to perform multi-parameter measurement of amplitudes and phases. Dual-path differential output achieves a high testing capability for defects under high lift-off change. At the same time, a fusion model is proposed by using the measured multi-parameters. The lift-off can be suppressed, the defect-testing capability can be improved when the lift-off changes, and operations such as parameter adjustment are not needed, indicating simple and practical properties.

Embodiment 1

Since physical information can be converted into circuit parameters, different signal conditioning circuits can measure different physical parameters, so conditioning circuits are also important in parameter measurement of non-destructive testing and evaluation technology. For example, low-frequency components are tested in pulsed eddy currents through inductive coupling methods, and magnetic fields or change rates of magnetic fields are measured by magnetic sensors (e.g. Hall, AMR, GMR, TMR) or induction coils. The peak amplitude, zero-crossing time, phase, peak arrival time, rise time, etc. reflect the magnetic flux generated by eddy currents, which carries the information about the sample. From the perspective of power transfer, magnetic coupling has the greatest energy transfer and maintains constant efficiency over a certain range, which uses sweep excitation with multiple resonant frequencies to obtain different defect information and parameter acquisition. In addition, the real and imaginary parts of impedance are generally extracted. Under this effect, the signal conditioning circuits in traditional eddy current testing are resonant circuits, bridge circuits and inductively coupled transformers. The classical resonant circuit includes an inductor and capacitor connected in parallel, where the peak voltage reaches its maximum value at the resonant frequency. When a defect exists, the frequency change of the resonant frequency will cause a sharp drop in voltage. The bridge circuit uses inductors and resistors as bridge arms to convert changes in impedance into voltages. The inductively coupled system refers to a transformer in which two or more coils are coupled to each other. However, these characteristics vary due to different coupling parameters (such as discontinuities, cracks or delaminations). Therefore, designing and selecting appropriate sensing probes and conditioning circuits are particularly critical in eddy current testing.

In an exemplary embodiment, an eddy current testing circuit is provided, including:

a probe, including an excitation unit and an induction unit, where the excitation unit forms a differential bridge for receiving an excitation signal and outputting a first differential signal, i.e. an output signal $U_{o1}$ of the bridge in the figure, and the induction unit couples with the excitation unit to form a transformer conditioning circuit and output a second differential signal, i.e. an output signal $U_{o2}$ of a transformer; and a differential signal processing unit, configured to receive the first differential signal $U_{o1}$ and the second differential signal $U_{o2}$, analyze a relationship between a parameter of the first differential signal $U_{o1}$, a parameter of the second differential signal $U_{o2}$ and lift-off under an alternating magnetic field, and fuse the parameter of the first differential signal $U_{o1}$ with the parameter of the second differential signal $U_{o2}$ to eliminate an influence of the lift-off on the signals.

The excitation unit is composed of a plurality of excitation coils arranged in a row side by side, and the induction unit is composed of a plurality of induction coils placed in one-to-one correspondence with the excitation coils, where the induction coils and the excitation coils have opposite coil winding directions;

the eddy current testing circuit further includes a first differential amplifier and a second differential amplifier, an input end of the excitation coil is connected to an output end of a signal generator, the plurality of excitation coils are connected in parallel, and an output end of the excitation coil is connected with a capacitor or a resistor; output ends of two adjacent excitation coils are both connected to a first differential amplifier for amplifying and outputting the first differential signal $U_{o1}$; and output ends of two adjacent induction coils are connected to a second differential amplifier for amplifying the output second differential signal $U_{o2}$.

Specifically, as shown in FIG. 1 to FIG. 5, the probe structure is composed of two groups of two sets of planar square spiral coils placed horizontally. Each set of coils includes two square coils of equal size. For the two sets of coils, one set includes excitation coils, and the other set includes induction coils. The excitation coils are connected in parallel. The winding direction of the induction coils is opposite to that of the excitation coils. The excitation coils and the induction coils are placed side by side on the same plane. The winding mode of the coils determines the difference in the conditioning circuits of these two sets of coils, which is a combination of a differential bridge circuit and a transformer conditioning circuit. It should be noted that in other embodiments, the excitation coils and induction coils can be placed vertically. The number of the excitation coils can be an even number greater than 2 according to actual requirements.

Further, when the excitation coils and induction coils are placed side by side on the same plane, the total magnetic flux received by the induction coils is the sum of the magnetic field generated by the excitation coils and the magnetic field generated by the eddy currents in the tested component. When vertically placed, a large amount of magnetic flux generated by the excitation coils directly penetrates into the induction coils (direct coupling between the coils), so the background signal is strong. However, when placed horizontally relative to each other, the coupling vector distance between the coils is large, the coupling coefficient is small, and the magnetic flux generated by the excitation coils received by the induction coils is low. Therefore, the background signal is weak, and more information about the tested component can be received. This placement mode has a better suppressing effect on the lift-off than the vertical placement mode. Secondly, the attenuation rate of eddy currents in the tested component is negatively correlated with the radius of the coil. When placed horizontally, the excitation coil can be regarded as the center of a circle, and the distance from the excitation coil to the induction coil can be regarded as the radius. Therefore, with a larger radius, the attenuation rate of eddy currents is slower, and in theory, deeper defects can be tested.

Figure 2:
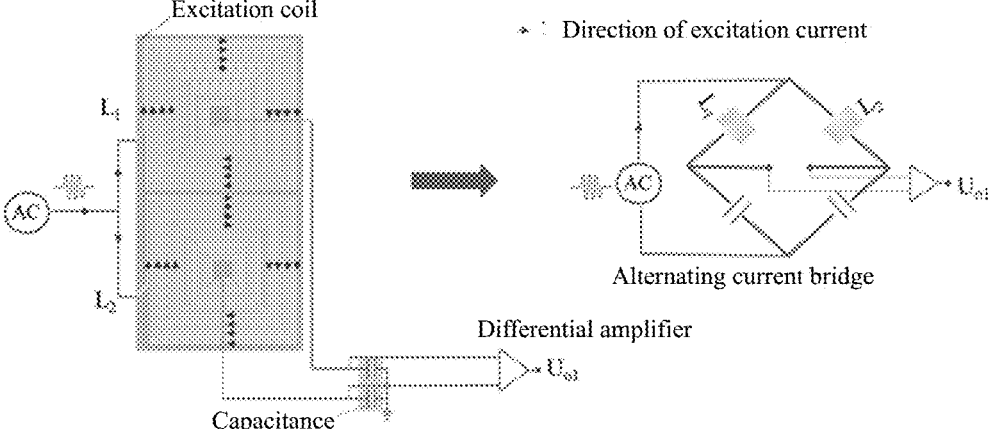
FIG. 2 is a schematic diagram showing a structure of an excitation coil and a connection of a differential bridge according to the present invention.

Further, in an example, a differential bridge is provided. The excitation unit includes two excitation coils. Two adjacent excitation coils serve as two arms of an alternating current bridge, and the corresponding two capacitors or resistors are connected to the other two arms of the alternating current bridge. Specifically, as shown in FIG. 2, $L_1$ and $L_2$ of the excitation coils act as two arms of the alternating current bridge, and the remaining two arms are two capacitors with an equal capacitance value of C. Therefore, the differential voltage of the two capacitors is the output of the set of alternating current bridges, referred to as $U_{o1}$. The excitation coils consist of two horizontally-placed coils with exactly the same size and parameters. The common end of the two coils is connected in parallel to the signal generator, and the remaining ends are respectively connected in series with capacitors of equal capacitance. The other ends of the two capacitors are grounded. The voltage across the capacitors is fed into the differential amplifier. As a result, the current direction of the entire excitation coil is the same, and the two coils and the two capacitors form one bridge connection mode.

Figures 3, 4:
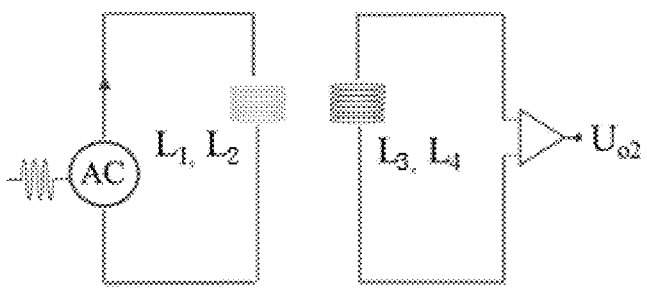
FIG. 3 is a schematic diagram showing a connection of an equivalent transformer according to the present invention.
FIG. 4 shows a probe structure corresponding to 2 or more sets of excitation coils according to the present invention.

Further, based on the probe, a transformer is provided. The induction coil is formed by connecting two coils in series with the same winding direction. These two coils are of equal size and have the same wire diameter, and one end of each of them is respectively connected to a differential amplifier to enhance the testing capability for defects. Therefore, regarding the two excitation coils as a whole and the differential induction coils as a whole, as shown in FIG. 3, the excitation coil $L_1$ and the excitation coil $L_2$ constitute the primary side of the transformer, while the induction coil $L_3$ and the induction coil $L_4$ constitute the secondary side of the transformer. Therefore, the differential voltage $U_{o2}$ is obtained from the differential induction coil composed of the induction coil $L_3$ and the induction coil $L_4$.

Figure 6:
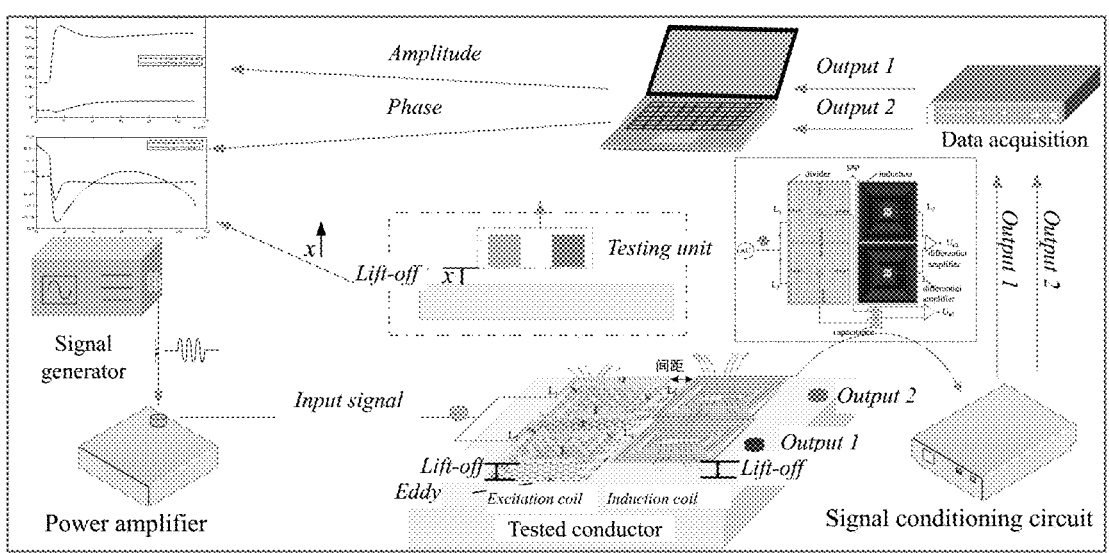
FIG. 6 is a schematic diagram showing operation of an eddy current probe based on a differential bridge and a transformer conditioning circuit according to the present invention.
Figure 7:
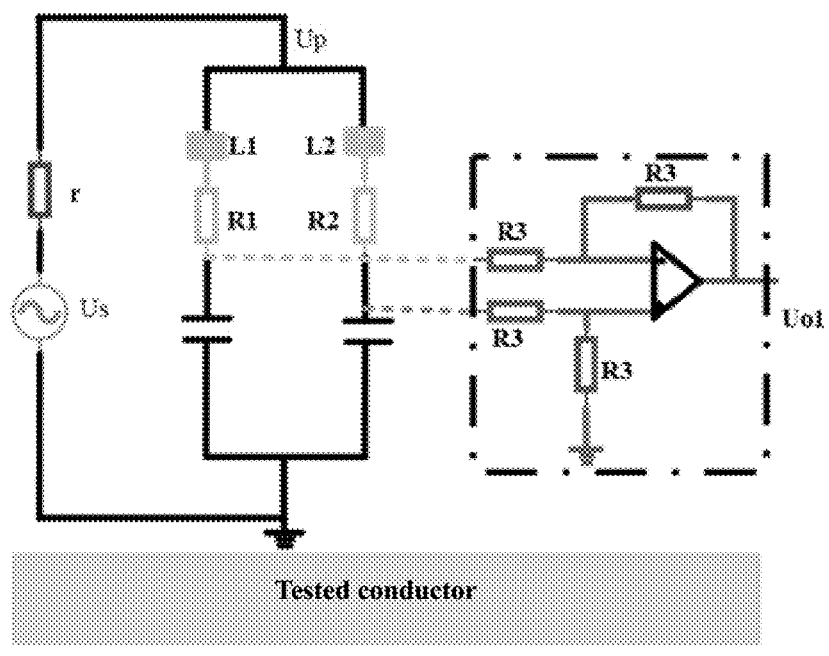
FIG. 7 is a circuit diagram corresponding to a first differential signal during modeling according to the present invention.
Figure 8:
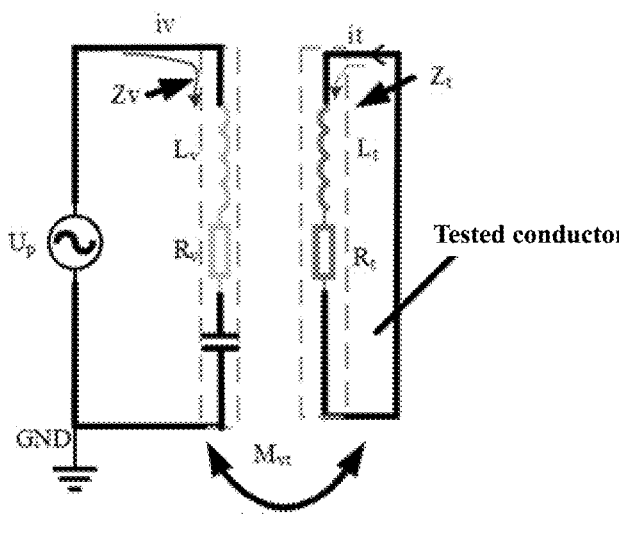
FIG. 8 is an equivalent circuit diagram corresponding to a first differential signal according to the present invention.
Figure 9:
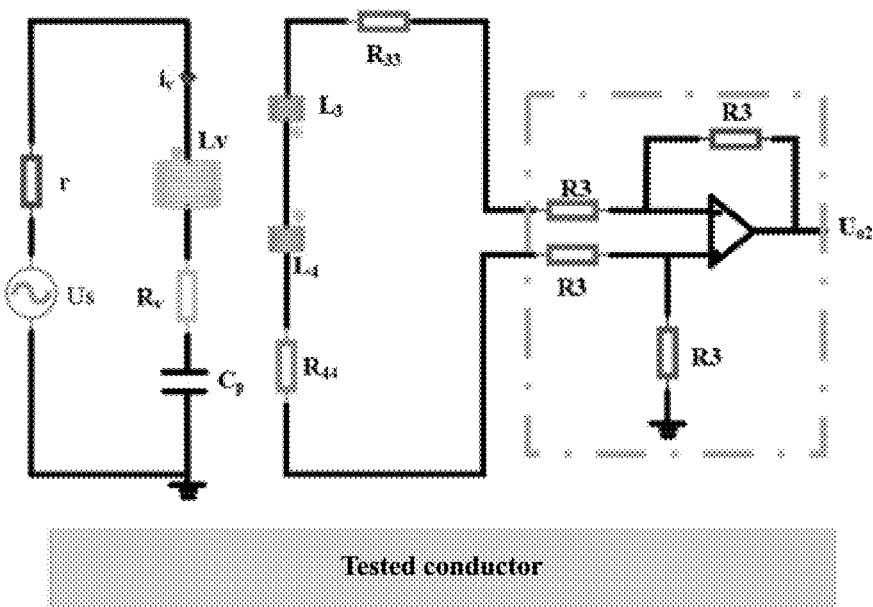
FIG. 9 is a circuit diagram corresponding to a second differential signal during modeling according to the present invention.
Figure 10:
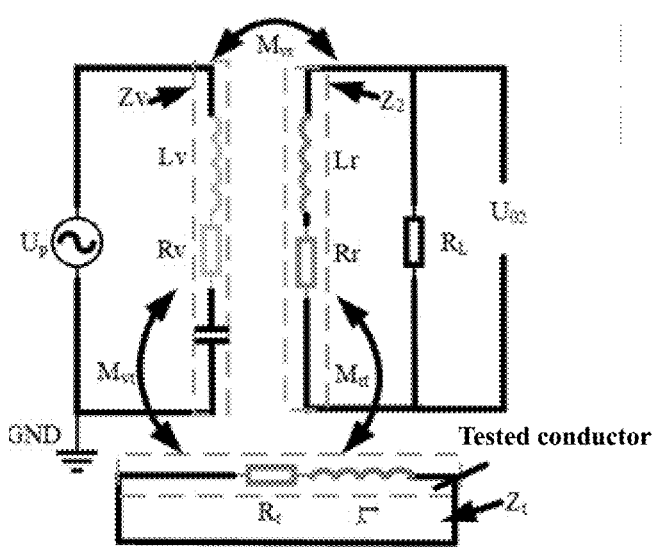
FIG. 10 is an equivalent circuit diagram corresponding to a second differential signal according to the present invention.

Further, as shown in FIG. 6, the parallel input terminals of the excitation coils are connected to a signal generator. The output terminal of each excitation coil is connected to the first differential amplifier after being connected in series with one capacitor. The first differential amplifier is configured to output the first differential signal $U_{o1}$. The output terminals of the induction coils are connected to the second differential amplifier. The second differential amplifier is configured to output the second differential signal $U_{o2}$. Specifically, the signal generator generates a sine wave signal of a specific frequency, and this signal is injected into a power amplifier to enhance the load-carrying capacity of the probe. The excitation coils receive the amplified alternating current signal. The probe interacts with the conductor under the alternating electromagnetic field to generate eddy currents. The excitation coils output the first differential signal $U_{o1}$ through the first differential amplifier. The induction coils output the second differential signal $U_{o2}$ under the mutual influence of the excitation coils and the tested conductor. Both signals are output to the signal conditioning circuit, further collected by the data acquisition unit, and finally subjected to subsequent analysis by the differential signal processing unit.

Further, during testing, as the lift-off distance changes, the intensity of the eddy currents on the tested conductor component also changes. Thus, the amplitudes and phases of the two outputs change. The acquisition circuit collects the data of the changed amplitudes and phases.

The probe of the present invention adopts a combination mode of a differential bridge and a transformer conditioning circuit to measure multiple parameters such as amplitudes and phases of the outputs of the excitation unit and the induction unit respectively. Dual-path differential output achieves a high testing capability for defects under high lift-off change. At the same time, by fusing the signal parameters of the two differential signals, the lift-off can be suppressed, and operations such as parameter adjustment are not needed, indicating simple and practical properties.

In another example, as shown in FIG. 4, two adjacent excitation coils are taken as a set. The excitation unit includes a plurality of sets of excitation coils, and the corresponding induction unit includes a plurality of sets of induction coils. The working principle of each set of coils is in accordance with the implementation of the coils in FIG. 1. All the coils are located in the same horizontal plane. Fusion measurement of more sets of differential output signal parameters enables more accurate testing for defects.

Figure 5:
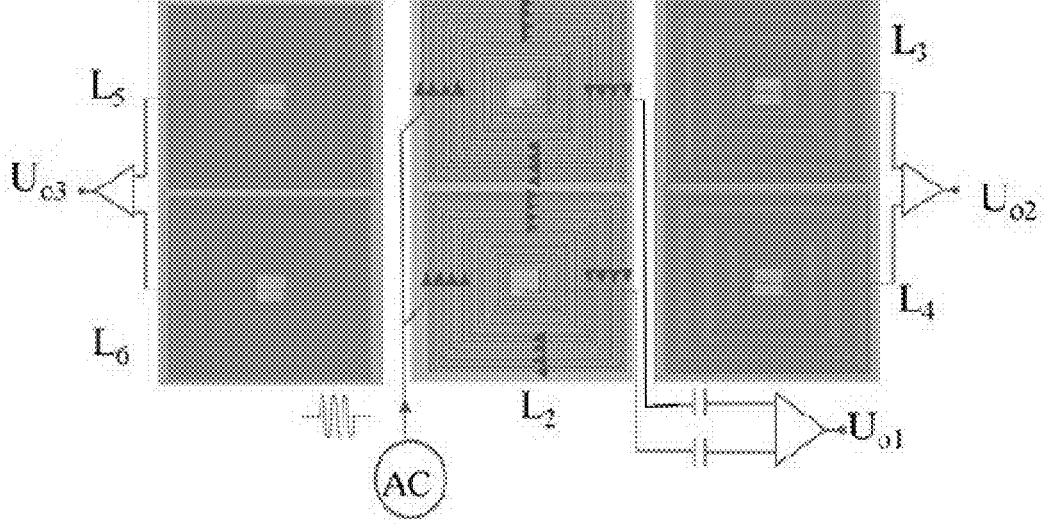
FIG. 5 is a schematic diagram showing a probe structure with one set of excitation coils corresponding to two sets of induction coils according to the present invention.

In another example, as shown in FIG. 5, one set of excitation coils can correspond to two sets of induction coils, where all the coils are located in the same horizontal plane, and the two sets of induction coils are located on both sides of the excitation coils respectively. Similarly, performing fusion measurement on more sets of differential output signal parameters enables more accurate testing for defects. It should be noted that other arrays based on this probe or modifications made based on the same principle still fall within the scope of protection of this application.

Embodiment 2

Based on Embodiment 1, an eddy current testing method is provided, including steps of:

S1. acquiring a first differential signal $U_{o1}$ and a second differential signal $U_{o2}$ output by a probe in the case of lift-off change, where the first differential signal $U_{o1}$ is output by an excitation unit of the probe, and the second differential signal $U_{o2}$ is output by an induction unit of the probe;

S2. analyzing a relationship between a parameter of the first differential signal $U_{o1}$, a parameter of the second differential signal $U_{o2}$ and lift-off under an alternating magnetic field; and S3. fusing the parameter of the first differential signal $U_{o1}$ with the parameter of the second differential signal $U_{o2}$ to eliminate an influence of the lift-off on the signals.

Further, the S2 includes:

calculating an amplitude and a phase parameter of the first differential signal $U_{o1}$, and calculating an amplitude and a phase parameter of the second differential signal $U_{o2}$; and analyzing a relationship between the amplitude of the first differential signal $U_{o1}$, a phase of the first differential signal $U_{o1}$, the amplitude of the second differential signal $U_{o2}$ and a phase of the second differential signal $U_{o2}$ each and the lift-off.

Further, the S3 includes:

fusing the amplitude of the first differential signal $U_{o1}$ with the amplitude of the second differential signal $U_{o2}$;

performing linear processing on the phase parameter of the first differential signal $U_{o1}$ and/or the second differential signal $U_{o2}$; and fusing a fused amplitude with a linearly processed phase parameter to obtain a final testing signal. The tested component is analyzed for defects based on the final testing signal.

Specifically, referring to FIGS. 7-10, in order to analyze the mapping relationship between signal characteristics and the lift-off under the change of the lift-off of the proposed probe, a system output response is established based on an equivalent circuit model. For the excitation coils, since the exciting current directions of the two coils are the same, the magnetic field directions in the middle region of the two coils are opposite. Therefore, the magnetic field region composed of the excitation coil $L_1$ and the excitation coil $L_2$ can be regarded as a whole under the interaction of the mutual inductance $M_{12}$. If the entirety constituted by the tested conductor and the coils are regarded as a system, then the output of the bridge is the electromagnetic coupling between the entire $L_v$ constituted by this pair of parallel coils (i.e. $L_1$, $L_2$) and the tested conductor. Although the output of the differential bridge is a differential signal, which is configured to amplify external input differential signals that may destroy the balance of the bridge and suppress common mode signals (such as temperature, etc.), when the lift-off changes, no quantity that disrupts the balance is generated. Therefore, as long as the lift-off changes, the output of the bridge is the result of the lift-off change. If a defect is located below the single-coil bridge arm, the balance of the bridge will be broken, and the differential-mode output is the defect response signal. As for the transformer induction coils, they not only receive the magnetic field directly coupled by the excitation coils, but also receive the reflected magnetic field of the eddy currents on the tested conductor (the magnetic field between the induction coils themselves and the tested conductor can be neglected). From the result, the output of the differential coils is the result of the difference between these two magnetic fields. The differential coils (i.e. $L_3$ and $L_4$) are also regarded as an entire $L_r$.

Further, obtaining the first differential signal $U_{o1}$ and the second differential signal $U_{o2}$ each includes:

The tested conductor is equivalent to a coil with inductance and resistance. The equivalent circuits corresponding to the first differential signal $U_{o1}$ and the second differential signal $U_{o2}$ are established, and modeling is performed based on the equivalent circuits. The tested conductor is equivalent to a coil with inductance Lt and resistance Rt, modeling can be performed according to Kirchhoff's laws. Thus, the dual-path signals are performed under the lift-off change based on the equivalent circuits to obtain:

$$\begin{cases} R_v I_v + j2\pi f L_v I_v - j2\pi f M_{vt} I_e = U_p \\ R_e I_e + j2\pi f L_e I_e - j2\pi f M_{vt} I_v = O \end{cases} \tag{1}$$

where $R_v$ and $L_v$ refer to an equivalent resistance and an equivalent inductance formed by two parallel excitation coils under the action of the magnetic field. $I_v$ is an equivalent current fed into the excitation coils, and $U_p$ is a voltage of a sinusoidal signal fed into the coils. f refers to the frequency of the fed excitation signal, and $I_c$ is an eddy current generated in the conductor. $M_{vt}$ is a mutual inductance between the excitation coils and the conductor under test and is related to the lift-off distance x, and $k_{vt}$ is a coupling coefficient between the excitation coils and the tested conductor.

$$M_{vt} = k_{vt}(x)\sqrt{L_v L_t} \tag{2}$$

where $0<k_{vt}(x)<1$, and changes in the current $I_v$ and the impedance $Z_v$ are obtained from (1):

$$I_v = \frac{U_p}{\left[R_v + \frac{(2\pi f M_{vs})^2 R_t}{R_t^2 + (2\pi f L_t)^2}\right] + j2\pi f\left[L_v - \frac{(2\pi f M_{vt})^2 L_t}{R_t^2 + (2\pi f L_t)^2}\right]} \tag{3}$$

$$Z_v = \left[R_v + \frac{(2\pi f M_{vt})^2 R_t}{R_t^2 + (2\pi f L_t)^2}\right] + j2\pi f\left[L_v - \frac{(2\pi f M_{vt})^2 L_t}{R_t^2 + (2\pi f L_t)^2}\right] \tag{4}$$

for the output $U_{o1}$ of the bridge, the current changes of the two paths are mainly output, and the current change $\Delta I_v$ mainly depends on the impedance change $\Delta Z_v$, so the two equations are as follows:

$$\Delta I_v \propto \frac{1}{\Delta Z_v} \tag{5}$$

$$\Delta U_{o1} \propto \frac{\Delta I_v}{j\omega C_s} \propto \frac{1}{\Delta Z_e} \tag{6}$$

where $C_s$ is a capacitance value of the capacitor connected in series with the coil, and the amplitude $|\Delta U_{O1}|$ and the phase parameter $\angle\Delta\phi_{O1}$ of the change in $U_{o1}$ can be further obtained:

$$\begin{cases} |\Delta U_{o1}| = \sqrt{(\Delta R_v)^2 + (\Delta L_v)^2} = \frac{|\Delta Z_v|}{(\Delta R_v)^2 - (\omega\Delta L_v)^2} \propto \frac{1}{k_{vt}^2(x)} \\ \angle\Delta\phi_{O1} = \arctan\left(\frac{\Delta L_v}{\Delta R_v}\right) \end{cases} \tag{7}$$

similarly, the change $|\Delta U_{O2}|$ of the output of the second-stage differential transformer is as follows:

$$|\Delta U_{o2}| \propto \frac{k_{vt}(x)}{k_{rt}(x)} \tag{8}$$

where $k_{rt}(x)$ refers to a mutual inductance coefficient between the induction coils and the tested conductor, and the coefficient is also related to the lift-off distance x.

The phase change $\angle\Delta\phi_{o2}$ of the output of the second-stage differential transformer is as follows:

$$\angle\Delta\phi_{o2} \propto -\frac{\pi}{2}\frac{k_{vt}(x)}{k_{rt}(x)} \tag{9}$$

further, the fusing the amplitude $|AU_{O1}|$ of the first differential signal and the amplitude $|AU_{O2}|$ of the second differential signal includes:

eliminating the common influence of the lift-off on the amplitude parameters of the two differential signals using the relationship between the amplitude of the first differential signal $U_{o1}$ and the amplitude of the second differential signal $U_{o2}$. It can be found from the model that the lift-off has a common influence on the amplitude parameters of the two output channels, i.e. $k_{vt}$, and the influences on the amplitude parameters are negatively correlated. Therefore, their amplitude relationship is proposed to be used to eliminate the influence of $k_{vt}$:

$$|\Delta U_{o2}|^2 \times |\Delta U_{o1}| \propto \left(\frac{k_{vt}^2(x)}{k_{rt}^2(x)} \times \frac{1}{k_{vt}^2(x)} = \frac{1}{k_{rt}^2(x)}\right) \tag{10}$$

the performing linear processing on the phase parameter of the first differential signal $U_{o1}$ and/or the second differential signal $U_{o2}$ includes:

performing a differential operation using the phase parameter of the first differential signal $U_{o1}$ and/or the second differential signal $U_{o2}$ to remove nonlinearity thereof. It can be seen from equation (10) that the change amount after the amplitude fusion is only related to the coupling coefficient of the induction coil and the eddy current, which reflects more information about the tested component. Equation (7) reflects that the phase of this path of signal is independent of the lift-off, but there is nonlinearity. Therefore, the differential operation on the phase can be used to remove the nonlinearity of the phase and fuse the path of signal with the existing amplitude signal to enhance the defect information. That is:

$$diff(\angle\Delta\phi_{o1}) = -diff\left(actan\left(\frac{\Delta L_t}{\Delta R_t}\right)\right) = -\frac{\Delta L_t^2}{\Delta L_t^2 + \Delta R_t^2} \tag{11}$$

The final fused testing signal for the defect testing of the tested component is obtained as follows:

$$U_{finally} = |\Delta U_{o2}|^2 \times |\Delta U_{o1}| \times diff(\angle\Delta\phi_{o1}) \tag{12}$$

The method adopts a combination mode of a differential bridge and a transformer conditioning circuit to perform multi-parameter measurement of amplitudes and phases. Dual-path differential output achieves a high testing capability for defects under high lift-off change. At the same time, a fusion calculation is proposed by using the measured multi-parameters. The lift-off can be suppressed, the defect-testing capability can be improved when the lift-off changes, and operations such as parameter adjustment are not needed, indicating simple and practical properties.

Embodiment 3

Based on the same inventive concept as that of Embodiment 2, an eddy current testing system is provided, including:

a differential signal acquisition module, configured to acquire a first differential signal $U_{o1}$ and a second differential signal $U_{o2}$ output by a probe in the case of lift-off change, where the first differential signal $U_{o1}$ is output by an excitation unit of the probe, and the second differential signal $U_{o2}$ is output by an induction unit of the probe;

a parameter calculation module, configured to analyze a relationship between a parameter of the first differential signal $U_{o1}$, a parameter of the second differential signal $U_{o2}$ and lift-off under an alternating magnetic field; and a multi-parameter fusion module, configured to fuse the parameter of the first differential signal $U_{o1}$ with the parameter of the second differential signal $U_{o2}$ to eliminate an influence of the lift-off on the signals.

The multi-parameter fusion module is configured to fuse an amplitude of the first differential signal $U_{o1}$ with an amplitude of the second differential signal $U_{o2}$, perform linear processing on a phase parameter of the first differential signal $U_{o1}$ and/or the second differential signal $U_{o2}$, and fuse a fused amplitude with a linearly processed phase parameter to obtain a final testing signal; and a defect analysis module is configured to analyze the tested component for defects based on the final testing signal.

The multi-parameter fusion module eliminates the common influence of the lift-off on the amplitude parameters of the two differential signals using the relationship between the amplitude of the first differential signal $U_{o1}$ and the amplitude of the second differential signal $U_{o2}$. The change amount after the amplitude fusion is only related to the coupling coefficient of the induction coil and the eddy current, which reflects more information about the tested component. A differential operation is performed using the phase parameter of the first differential signal $U_{o1}$ and/or the second differential signal $U_{o2}$ to remove nonlinearity thereof. The differential operation on the phase is used to remove the nonlinearity of the phase and fuse the path of signal with the existing amplitude signal to enhance the defect information.

Embodiment 4

Figure 11:
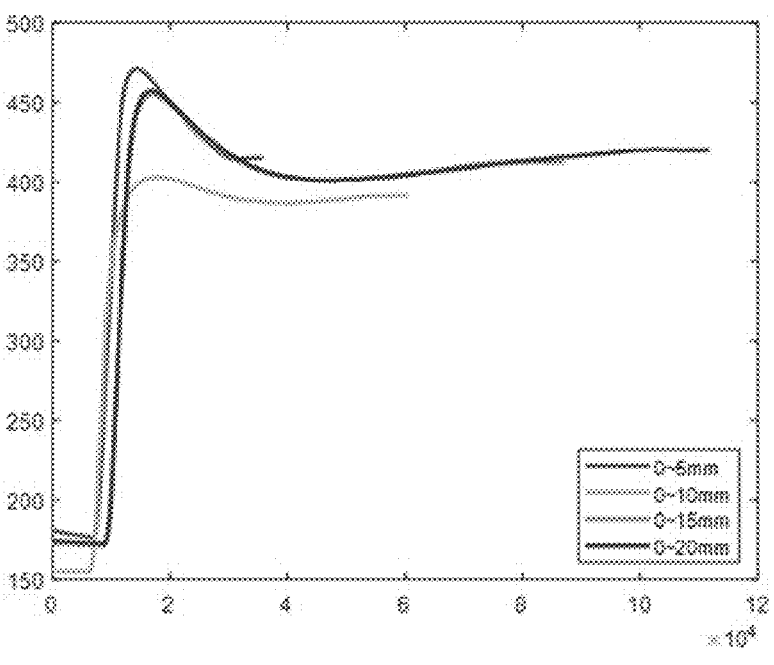
FIG. 11 is a graph showing an amplitude change of a bridge output when lift-off increases according to the present invention.
Figure 12:
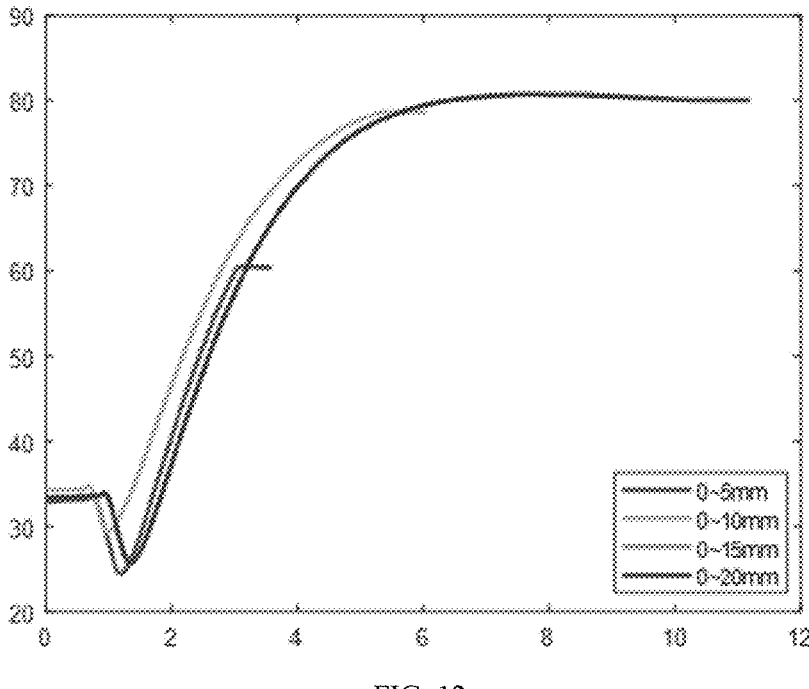
FIG. 12 is a graph showing an amplitude change of a transformer output when lift-off increases according to the present invention.
Figure 13:
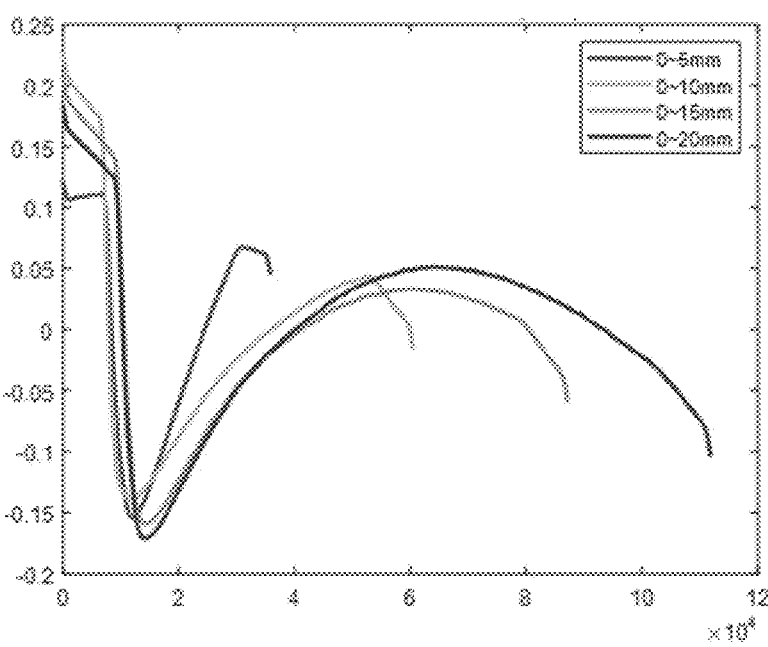
FIG. 13 is a graph showing a phase change of a bridge output when lift-off increases according to the present invention.
Figure 14:
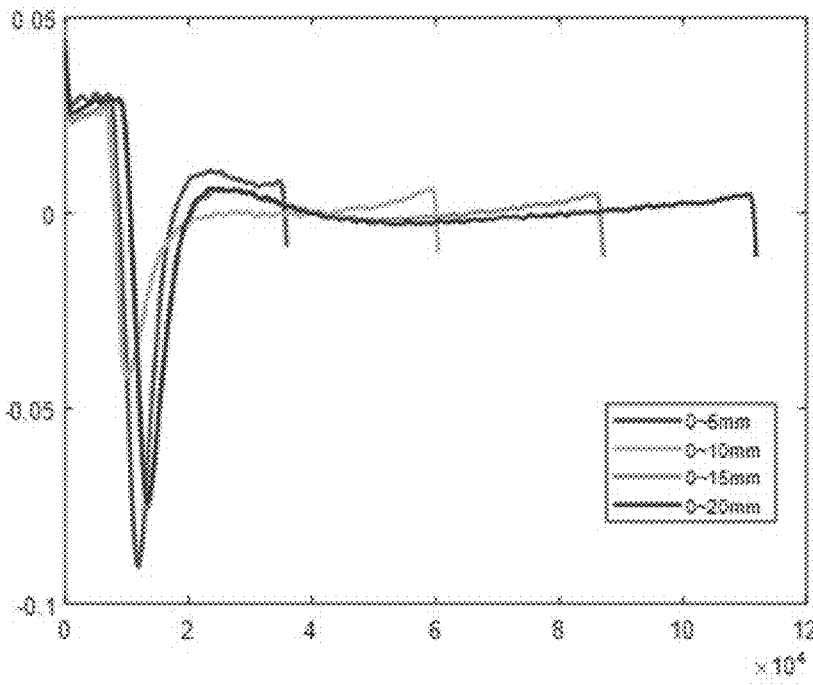
FIG. 14 is a graph showing a phase change of a transformer output when lift-off increases according to the present invention.

Based on Embodiment 3, in this embodiment, the testing effect and the testing method of the probe are verified through examples. Specifically, first, the changes in the dual-path output signals when the lift-off increases are verified. As shown in FIGS. 11-14, in the process of continuously lifting the probe upward from a point, the changes in the output of the dual-path output signals are different. As shown in FIG. 11, for the output of the bridge, as the lift-off increases, the amplitude of the output signal first increases and then decreases. As shown in FIG. 12, for the output of the transformer, under the same conditions, the amplitude of the output signal first decreases and then increases. Therefore, it reflects that the parameters measured by the two outputs for the same variable are different, which also lays the foundation for the proposal of the lift-off fusion suppression method.

Figure 15:
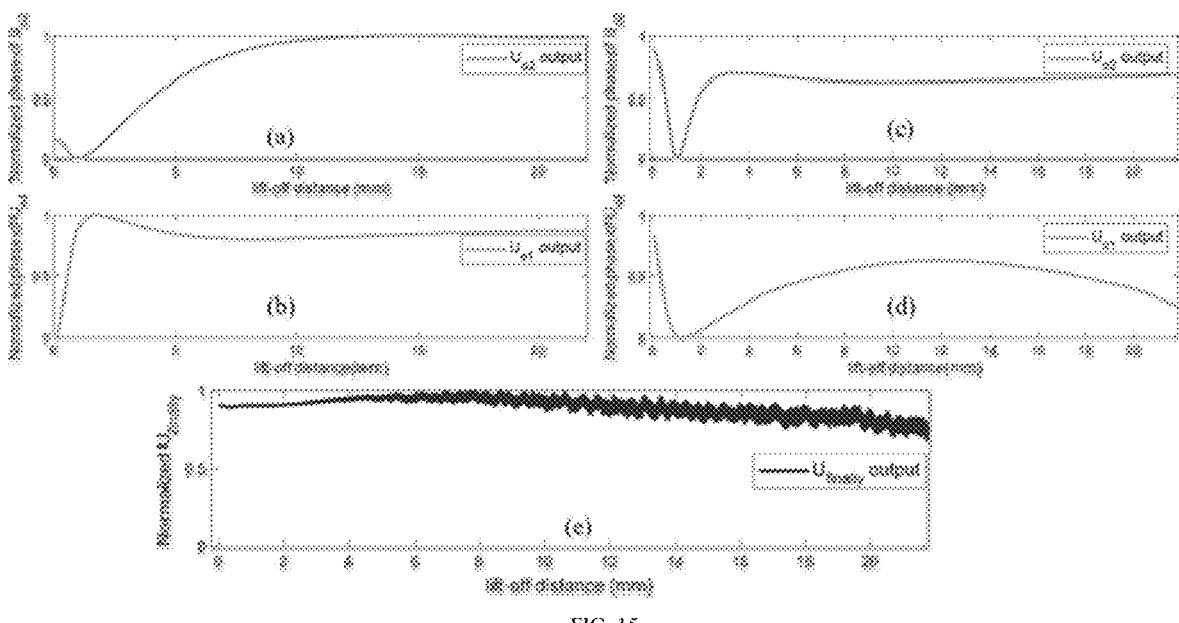
FIG. 15 shows a processing result of a lift-off change curve using a fusion model according to the present invention.

Further, the effect of the parameter fusion testing method is verified. As shown in FIG. 15, after parameter fusion, the originally nonlinearly changing curve becomes relatively smooth as a whole. This indicates that with the change of the lift-off, the final change is not significant, and also verifies that this fusion method has the effect of lift-off suppression.

Figure 16:
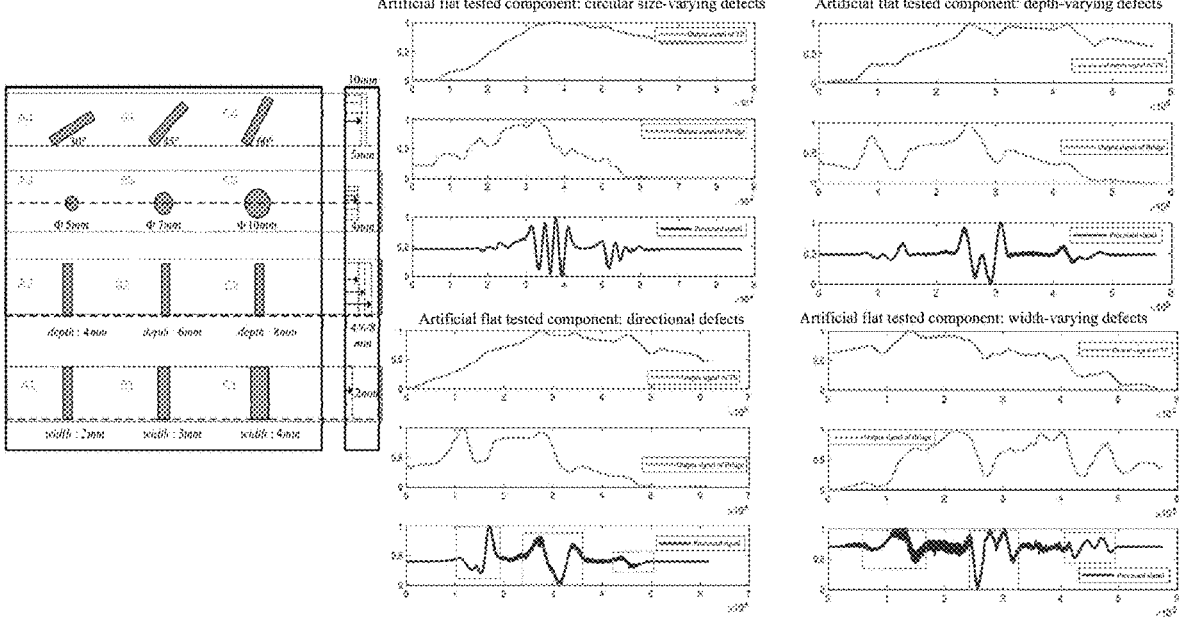
FIG. 16 shows testing results and signal fusion results for different defects when lift-off gradually increases according to the present invention.

Further, the testing effect of the probe sensor and the signal fusion results for different defects when the lift-off gradually increases are verified. As shown in FIG. 16, tests are performed on a tested component with different types of defects, where the different types of defects include circular size-varying defects, depth-varying defects, directional defects, and width-varying defects. After raising the flat tested component to a certain height, the probe is used to scan defects of the same type, thus simulating the defect testing process when the lift-off continuously increases. It can be seen from the figure that the fused signal can easily distinguish the defects.

Figure 17:
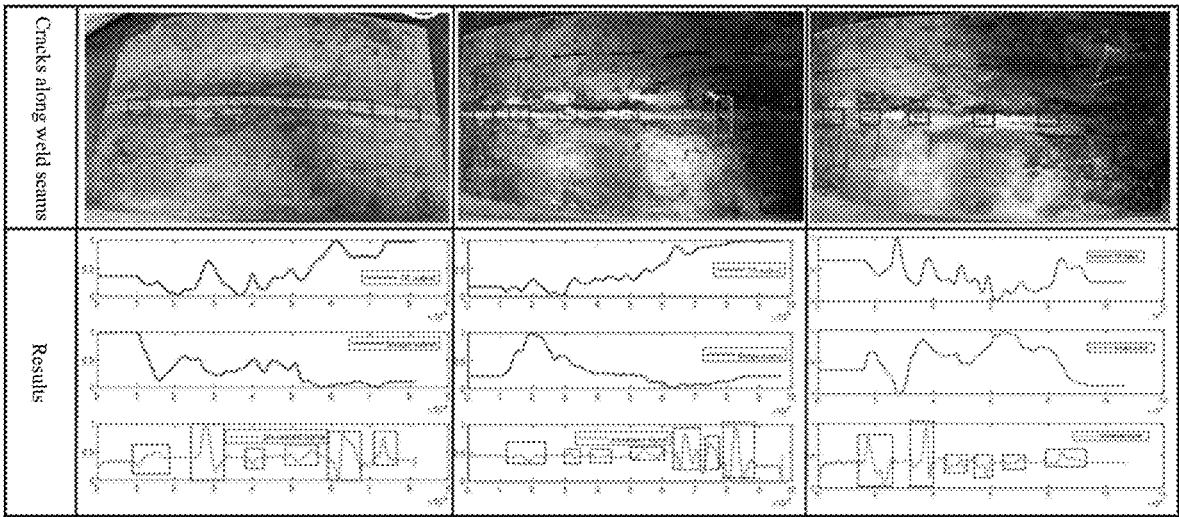
FIG. 17 shows testing results and signal fusion results for cracks along weld seams according to the present invention.

Further, the testing effect of the probe sensor and the signal fusion results for cracks along weld seams are verified. In order to verify the adaptability of the method in complex environments, as shown in FIG. 17, considering the situation of irregular lift-off change, three groups of low-carbon X70 steel (with a conductivity of 7.77) are used to test a bent pipe containing cracks along weld seams. The shape of the bent pipe ensures that the lift-off distance changes irregularly in the testing process. In addition, the rough surface and material accumulation at the weld seam cause lift-off change, which also poses difficulties for the testing. Unlike the continuous lift-off change process, in this nonlinear lift-off change process, it is difficult to identify defect information from the original signals, and it is impossible to directly determine the number of defects from the original signals. However, all defects can be clearly obtained from the proposed parameter fusion response model.

Figure 18:
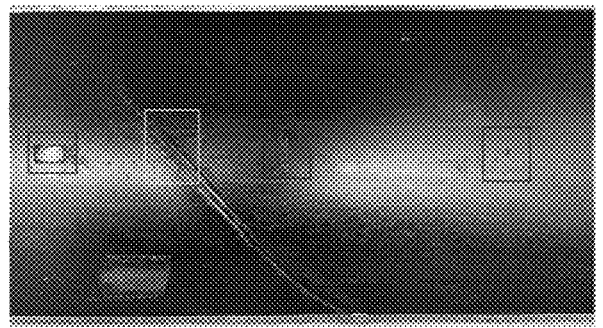
FIG. 18 shows testing results and signal fusion results for pipeline defects according to the present invention.
Figure 18:
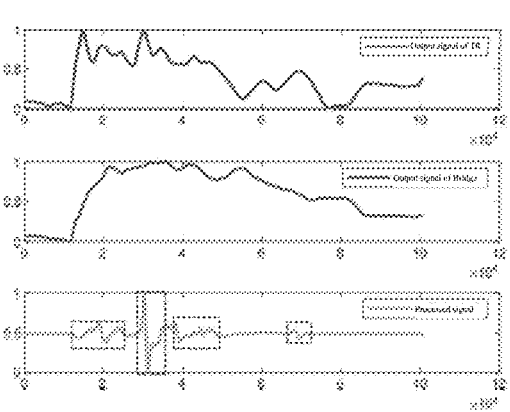

Further, the testing effect of the probe sensor and the signal fusion results for pipeline defects are verified. When testing defects on the inner wall of the pipeline, it is difficult to distinguish the number of defects from the original signals. However, as can be seen from the fused data in FIG. 18, all defects can be clearly presented. This indicates that the fusion can enhance the testing capability for defects and achieve a favorable signal-to-noise ratio.

Embodiment 5

This embodiment has the same inventive concept as Embodiment 2, and provides a storage medium having computer instructions stored thereon based on Embodiment 2, where when the computer instructions run, the eddy current testing method is performed.

Based on this understanding, the technical solution of the present embodiment essentially or a part that contributes to the prior art or a part of the technical solution may be embodied in the form of a software product. The computer software product is stored in one storage medium and includes several instructions for enabling a computer device (such as a personal computer, a server, or a network device, etc.) to perform all or part of the steps of the methods in embodiments of the present invention. The above storage medium includes various media that can store program codes, such as a USB flash disk, a mobile hard disk, a Read-Only Memory (ROM), a Random Access Memory (RAM), a magnetic disk or an optical disk.

Embodiment 6

This embodiment has the same inventive concept as Embodiment 1, and provides a terminal, including a memory and a processor, the memory having stored thereon computer instructions runnable on the processor, where when the processor runs the computer instructions, the eddy current testing method is performed.

The processor can be a single-core or multi-core central processing unit or a specific integrated circuit, or be configured as one or more integrated circuits for implementing the present invention.

Embodiments of the subject matter and functional operations described in this specification can be implemented in: computer software or firmware embodied in tangible form, computer hardware including the structures disclosed in this specification and structural equivalents thereof, or a combination of one or more thereof. Embodiments of the subject matter described in this specification can be implemented as one or more computer programs, i.e., one or more modules in computer program instructions encoded on a tangible non-transitory program carrier for execution by a data processing device or for controlling the operation of a data processing device. Alternatively or additionally, the program instructions may be encoded on an artificially generated propagated signal, such as a machine-generated electrical, optical or electromagnetic signal, which is generated to encode and transmit information to a suitable receiver device for execution by a data processing device.

The processing and logical flows described in this specification can be executed by one or more programmable computers executing one or more computer programs to perform corresponding functions by operating according to input data and generating outputs. The processing and logical flows can also be performed by a dedicated logic circuit, such as an FPGA (Field-Programmable Gate Array) or an ASIC (Application-Specific Integrated Circuit), and the apparatus can also be implemented as a dedicated logic circuit.

The processor suitable for executing a computer program includes, for example, a general-purpose and/or special-purpose microprocessor, or any other type of central processing unit. Generally, the central processing unit will receive instructions and data from a read-only memory and/or a random access memory. The basic components of a computer include a central processing unit for implementing or executing instructions and one or more memory devices for storing instructions and data. Generally, the computer will also include one or more mass storage devices for storing data, such as magnetic disks, magneto-optical disks or optical disks, or the computer will be operatively coupled to such a mass storage device to receive data therefrom or transfer data thereto, or both. However, it is not necessary for the computer to have such a device. In addition, a computer can be embedded in another device, such as a mobile phone, a Personal Digital Assistant (PDA), a mobile audio or video player, a game console, a Global Positioning System (GPS) receiver, or a portable storage device such as a Universal Serial Bus (USB) flash drive, to name just a few.

Although this specification includes many specific implementation details, these should not be construed as limiting the scope of any invention or what is claimed, but rather are mainly used to describe the features of specific embodiments of a particular invention. Certain features described in multiple embodiments in this specification can also be implemented in combination in a single embodiment. On the other hand, various features described in a single embodiment can also be implemented separately in multiple embodiments or in any suitable sub-combination. In addition, although features can function in certain combinations as described above and even be initially claimed as such, one or more features from a claimed combination can in some cases be removed from the combination, and the claimed combination can be directed to a sub-combination or a variation of a sub-combination.

Similarly, although operations are depicted in a particular order in the figures, this should not be understood as requiring that these operations be performed in the particular order shown or in sequential order, or that all of the illustrated operations be performed to achieve the desired result. In some cases, multitasking and parallel processing may be advantageous. In addition, the separation of various system modules and components in the above embodiments should not be understood as requiring such separation in all embodiments, and it should be understood that the described program components and systems can generally be integrated together in a single software product or packaged into multiple software products.

The above specific implementations are detailed descriptions of the present invention. It should not be considered that the specific implementations of the present invention are limited only to these descriptions. For those of ordinary skill in the art to which the present invention belongs, without departing from the concept of the present invention, several simple deductions and substitutions can be made, and all of them should be regarded as falling within the scope of protection of the present invention.

What is claimed is:

1. An eddy current testing circuit, comprising:
a probe, comprising an excitation unit and an induction unit, wherein the excitation unit forms a differential bridge for receiving an excitation signal and outputting a first differential signal, and the induction unit is configured to couple with the excitation unit to form a transformer conditioning circuit and output a second differential signal; and a differential signal processing unit, configured to receive the first differential signal and the second differential signal, analyze a relationship between a parameter of the first differential signal, a parameter of the second differential signal and lift-off under an alternating magnetic field, and fuse the parameter of the first differential signal with the parameter of the second differential signal to eliminate an influence of the lift-off on the signals, wherein the differential signal processing unit is further configured to
fuse an amplitude of the first differential signal with an amplitude of the second differential signal to obtain a fused amplitude such that fusing of the amplitudes eliminates the influence of the lift-off on the signals;
perform linear processing on a phase parameter of the first differential signal and/or a phase parameter of the second differential signal to obtain a linearly processed phase parameter; and fuse the fused amplitude with the linearly processed phase parameter to generate a final testing signal in which influence of the lift-off is eliminated.

2. The eddy current testing circuit according to claim 1, wherein the excitation unit is composed of a plurality of excitation coils arranged in a row side by side, and the induction unit is composed of a plurality of induction coils placed in one-to-one correspondence with the excitation coils, wherein the induction coils and the excitation coils have opposite coil winding directions;

an input end of the excitation coil is connected to an output end of a signal generator, the plurality of excitation coils are connected in parallel, and an output end of the excitation coil is connected with a capacitor or a resistor; output ends of two adjacent excitation coils are both connected to a first differential amplifier; and output ends of two adjacent induction coils are connected to a second differential amplifier.

3. The eddy current testing circuit according to claim 2, wherein the excitation coil and the induction coil are placed side by side, the two adjacent excitation coils serve as two arms of an alternating current bridge, and two corresponding capacitors or resistors are connected to other two arms of the alternating current bridge.

4. An eddy current testing method, comprising steps of:

S1. operating a probe and acquiring a first differential signal and a second differential signal output by the probe in the case of lift-off change, wherein the first differential signal is output by an excitation unit of the probe, and the second differential signal is output by an induction unit of the probe, wherein the probe comprises an excitation unit and an induction unit, wherein the excitation unit is configured to output the first differential signal, and the induction unit is configured to couple with the excitation unit to output the second differential signal;

S2. analyzing a relationship between a parameter of the first differential signal, a parameter of the second differential signal and lift-off under an alternating magnetic field; and S3. fusing the parameter of the first differential signal with the parameter of the second differential signal to eliminate an influence of the lift-off on the signals, wherein the S3 includes fusing an amplitude of the first differential signal with an amplitude of the second differential signal to obtain a fused amplitude such that the fusing of the amplitudes eliminates the influence of the lift-off on the signals;

performing linear processing on a phase parameter of the first differential signal and/or a phase parameter of the second differential signal to obtain a linearly processed phase parameter; and fusing the fused amplitude with the linearly processed phase parameter to generate a final testing signal in which influence of the lift-off is eliminated.

5. The eddy current testing method according to claim 4, wherein the S2 comprises:

calculating the amplitude and the phase parameter of the first differential signal, and calculating the amplitude and the phase parameter of the second differential signal; and analyzing a relationship between the amplitude of the first differential signal, a phase of the first differential signal, the amplitude of the second differential signal and a phase of the second differential signal each and the lift-off.

6. The eddy current testing method according to claim 4, wherein the performing linear processing on the phase parameter of the first differential signal and/or the second differential signal comprises:

performing a differential operation using the phase parameter of the first differential signal and/or the second differential signal to remove nonlinearity thereof.

7. An eddy current testing system, comprising:

a probe comprising an excitation unit and an induction unit, wherein the excitation unit is configured to output a first differential signal, and the induction unit is configured to couple with the excitation unit to output a second differential signal;

a differential signal acquisition module, configured to acquire the first differential signal and the second differential signal output by a probe in case of lift-off change;

a parameter calculation module, configured to analyze a relationship between a parameter of the first differential signal, a parameter of the second differential signal and lift-off under an alternating magnetic field; and a multi-parameter fusion module, configured to fuse the parameter of the first differential signal with the parameter of the second differential signal to eliminate an influence of the lift-off on the signals, wherein the multi-parameter fusion module is further configured to fuse an amplitude of the first differential signal with an amplitude of the second differential signal to obtain a fused amplitude such that the fusing of the amplitudes eliminates the influence of the lift-off on the signals;

perform linear processing on a phase parameter of the first differential signal and/or a phase parameter of the second differential signal to obtain a linearly processed phase parameter; and fuse the fused amplitude with the linearly processed phase parameter to generate a final testing signal in which influence of the lift-off is eliminated.

8. A terminal, comprising:

a memory and a processor, the memory having stored thereon computer instructions runnable on the processor, wherein when the processor runs the computer instructions such that the eddy current testing method according to claim 4 is performed; and the probe.

9. The terminal according to claim 8, wherein the S2 comprises:

calculating the amplitude and the phase parameter of the first differential signal, and calculating the amplitude and the phase parameter of the second differential signal; and analyzing a relationship between the amplitude of the first differential signal, a phase of the first differential signal, the amplitude of the second differential signal and a phase of the second differential signal each and the lift-off.

10. The terminal according to claim 8, wherein the performing linear processing on the phase parameter of the first differential signal and/or the second differential signal comprises:

performing a differential operation using the phase parameter of the first differential signal and/or the second differential signal to remove nonlinearity thereof.

* * * * *